United States Patent [19]
Simpson

[11] Patent Number: 5,619,887
[45] Date of Patent: Apr. 15, 1997

[54] CAMSHAFT TUNED VIBRATION DAMPER

[75] Inventor: Roger T. Simpson, Ithaca, N.Y.

[73] Assignee: Borg-Warner Automotive, Inc., Sterling Heights, Mich.

[21] Appl. No.: 520,352

[22] Filed: Aug. 28, 1995

[51] Int. Cl.$^6$ ............................................. F16F 15/123
[52] U.S. Cl. ........................... 74/574; 123/90.31; 464/180
[58] Field of Search ................... 74/574, 567; 123/90.17, 123/90.31; 464/61, 62, 65, 66, 180

[56] References Cited

U.S. PATENT DOCUMENTS

| 1,967,446 | 7/1934 | Meyer | 74/574 |
| 3,555,927 | 1/1971 | Plume | 464/180 X |
| 4,160,390 | 7/1979 | Spaetgens | 464/180 X |

FOREIGN PATENT DOCUMENTS

| 3215765 | 5/1983 | Germany | 74/574 |
| 861782 | 9/1981 | U.S.S.R. | 464/180 |
| 2156477 | 10/1985 | United Kingdom | 74/574 |

OTHER PUBLICATIONS

High–Speed Combustion Engines, P. M. Heldt, Sixteenth Edition of The Gasoline Motor, pp. 308 and 309.
A Handbook on Torsional Vibration, compiled by E. J. Nestorides, Cambridge at The University Press, 1958, pp. 119 and 127.

Primary Examiner—Rodney H. Bonck
Assistant Examiner—Mary Ann Battista
Attorney, Agent, or Firm—Thomas A. Meehan, Esq.; Greg Dziegielewski, Esq.

[57] ABSTRACT

A dry tuned damper (10) for mounting on an outboard end of a camshaft (C), the damper (10) having an annular housing (12) defined by inner and outer annular walls (14, 16) and an end wall (18) extending transversely therebetween, with a partition (20) extending diametrically between the inner and outer walls (14, 16) to divide the housing (12) into an opposed pair of compartments (22, 24). Shoes (26, 28) are positioned in the compartments (22, 24) and are biased outwardly against the outer wall (16) by a multitude of compression spring assemblies (30) each of which comprises a concentric pair of inner and outer springs (34, 36) trapped between the partition (20) and one of the shoes (26, 28) and slidably and retained by a pin (32) that extends through the partition (20) between the compartments (22, 24) and concentrically through the opposed pair of inner springs (34).

20 Claims, 1 Drawing Sheet

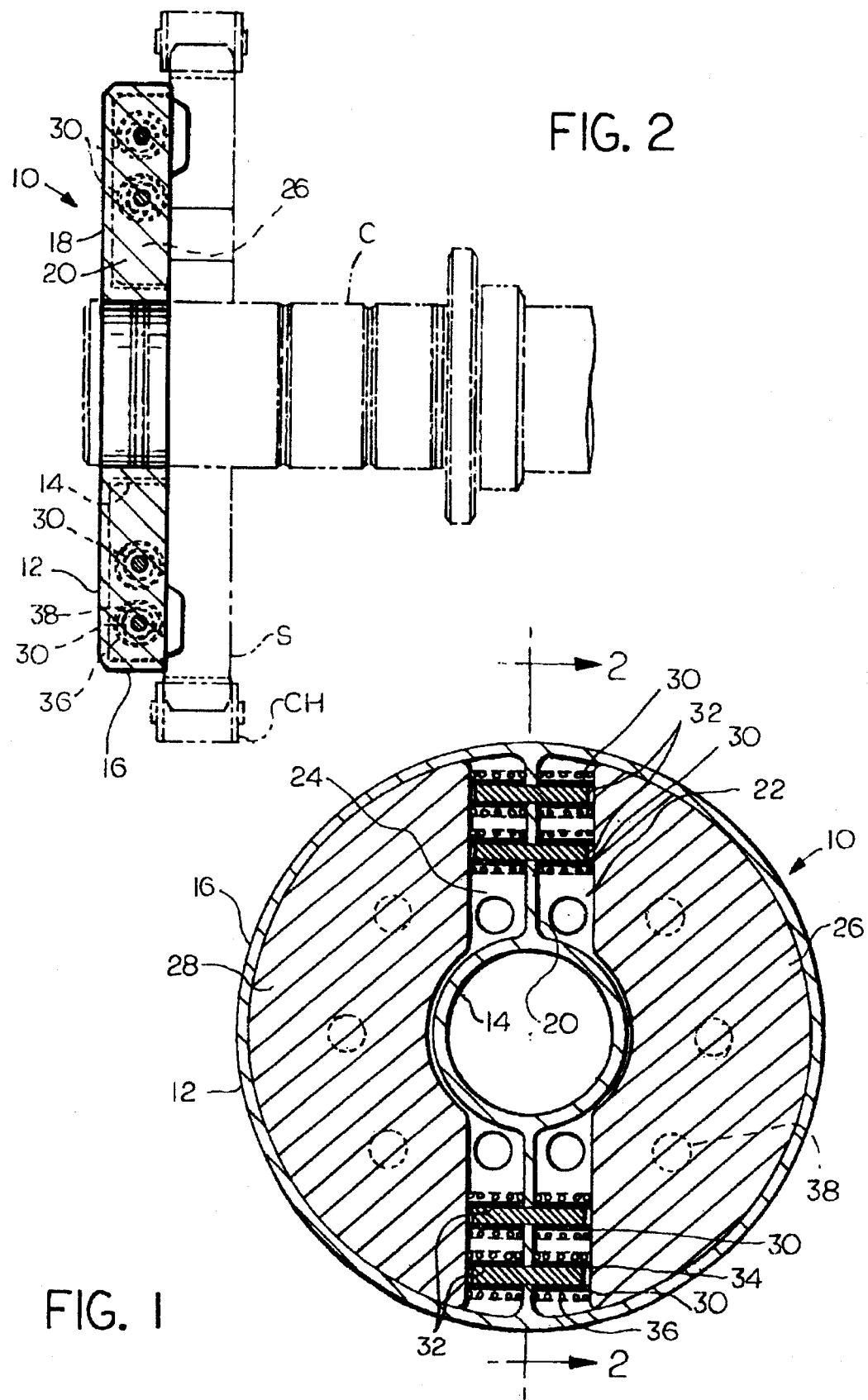

CAMSHAFT TUNED VIBRATION DAMPER

FIELD OF THE INVENTION

This invention relates to a tuned absorber or tuned damper for damping the vibrations of a timing drive in a four-cycle internal combustion engine.

BACKGROUND OF THE INVENTION

A rotating timing drive in an internal combustion engine, with a camshaft and on chain or belt and sprockets which are driven by the chain or belt, can often vibrate at its resonant frequency. Such vibrations can impose very substantial loads on the chain, or belt, used to drive the camshaft with resultant excessive wear or premature failure of the camshaft drive elements. To avoid such problems, it is known to mount a device, usually called a camshaft damper or a tuned absorber, on the rotating camshaft at a location near the camshaft drive sprocket or pulley and external to the engine block.

A typical camshaft damper of a type heretofore known includes an inner hub that is attached to the camshaft to be rotatable with the camshaft, a ring in and with which the inner hub rotates but is free to slightly oscillate with respect thereto, and a damping, elastomeric fluid that cushions the relative oscillating movement between the inner hub and the ring, which occurs as a result of the tendency of the camshaft to periodically speed up and then slow down in reaction to the torque pulses it experiences during normal service. These torque pulses lead to vibrations, which are especially large when the camshaft speed of rotation is at its resonant frequency. Such a damper has the effect of changing the amplitude of oscillation of the vibration of the camshaft when rotating at its resonant frequency by introducing a vibration that is 180° out of phase with that of the timing drive.

SUMMARY OF THE INVENTION

According to the present invention there is provided a dry, tuned absorber for a camshaft of an internal combustion engine, especially a camshaft for a four-cycle engine. The tuned absorber of the present invention is dry in that it eliminates the need for a damping or elastomeric fluid of various types of prior art dampers, which are often described as viscous dampers, the damper of the present invention more properly being described as a friction damper.

A friction damper according to the present invention includes an annular housing with a closed end, the annular housing having an inner annular wall that is secured to a camshaft at a location near the camshaft drive sprocket or pulley and external to the engine block of the associated engine. The housing further has an outer annular wall that is joined to the inner annular wall by a transversely extending end wall and a central, diametrically extending partition that extends between the inner and outer annular walls and divides the housing into an opposed pair of substantially semi-cylindrical compartments.

An arcuate shoe is placed in each of the compartments of the annular housing, and the arcuate shoes are biased away from the central partition of the annular housing by a multiplicity of compression springs that are retained by pins extending through openings in the central partition. The annular shoes, then, frictionally engage the inside surface of the outer annular wall of the annular housing, and introduce torque pulsations into the camshaft that are synchronous with, and oppositely directed with respect to, the normal torque pulsations experienced by the timing drive as it goes into a resonant frequency condition.

Accordingly, it is an object of the present invention to provide an improved camshaft tuned vibration damper for a camshaft of an internal combustion engine. More particularly, it is an object of the present invention to provide a dry, or non-viscous, tuned vibration damper of the foregoing character.

For a further understanding of the present invention and the objects thereof, attention is directed to the drawing and the following brief description thereof, to the detailed description of the preferred embodiment of the invention and to the appended claims.

IN THE DRAWING

FIG. 1 is an end view of a camshaft tuned vibration damper according to the preferred embodiment of the present invention; and FIG. 2 is a sectional view taken on line 2—2 of FIG. 1, the associated camshaft and camshaft drive sprocket being illustrated in broken line in FIG. 2.

DETAILED DESCRIPTION OF THE PREFERRED EMBODIMENT

A tuned vibration absorbing damper according to the preferred embodiment of the present invention is identified generally by reference numeral 10 in the drawing. The damper 10 is mounted on an end of a camshaft C of an internal combustion engine, otherwise not shown, particularly an engine of the four-cycle type, which rotates at one-half rotational speed of the crankshaft of the engine. The camshaft C is rotationally driven by a sprocket S and an endless chain CH in a known manner, the camshaft C, the sprocket S and the chain CH being shown in FIG. 2 only and there in outline only and being a part of the timing drive of the associated engine, not shown, which also includes the camshaft C. In any case, the damper 10 is mounted immediately outboard of the sprocket S on the camshaft C.

As is understood in the art, the camshaft C will experience torque reversals as it rotates in normal service, as a result of the opening and closing of the cam followers of the engine during the rotation of the camshaft C. These torque reversals cause vibrations in the camshaft C and in the other elements of the engine timing drive, and if the timing drive is vibrating at its resonant frequency, the vibrations from the timing drive will impose unusually large loads on the sprocket S and the chain CH, and on other elements in the drive train for driving the camshaft C. Such resonant frequency vibrations can cause premature wear or failure of the camshaft drive train elements, and can readily occur in a camshaft of a four-cycle internal combustion engine because the camshafts of such engines frequently rotate at or near or through a rotational speed that can result in resonant frequency vibrations.

The damper 10 includes an annular housing 12, the housing 12 being defined by an inner annular wall 14, which is secured to the camshaft C to rotate therewith, an outer annular wall 16, an annular end wall 18 extending transversely of and joining the inner wall 14 and the outer wall 16, and a central partition 20 extending diametrically between the outer wall 16 and the inner wall 14, the partition 20 being discontinued within the circumference of the inner wall 14. Preferably, the annular housing 12 is formed in a single piece from steel or other metallic material by stamping. The partition 20, thus, divides the interior of the housing 12 into generally semi-cylindrical compartments, 22, 24.

The damper 10 further includes arcuate shoes 26, 28 positioned within the compartments 22, 24, respectively, the shoes 26, 28 preferably being formed of a hard, durable material, such as steel, and having an outer circumference that is adapted to engage the inside surface of the outer wall 16 in surface to surface engagement.

The shoes 26, 28 are biased outwardly against the inside surface of the outer wall 16 by a multitude of compression spring assemblies 30, each spring assembly 30 being slidably retained by a pin 32 that extends through an opening in the partition 20 from the compartment 22 to the compartment 24. Preferably, for maximum biasing effect, each spring assembly 30 includes concentric inner and outer compression springs 34, 36 respectively, each of which is trapped between the partition 20 and one of the shoes 26, 28, each pin 32 extending concentrically through the interior of the inner compression springs 34 of an opposed pair of spring assemblies 30. For proper lubrication of the sliding action of the shoes 26, 28 with respect to the end wall 18 and the spring assemblies 30, the end wall 18 is provided with a multitude of openings 38 through which a lubricant, preferably engine oil, can be introduced into the housing 12.

During the rotation of the damper 10, the housing 12 will periodically tend to speed up, as the torque pulse in the timing drive operates at its resonant frequency in a given direction, and the housing 12 will periodically tend to slow down as the torque pulse in the timing drive operates at its resonant frequency in the opposed direction. Due to the inertia of the shoes 26, 28, they will not tend to speed up when the housing 12 tends to speed up, and they will not tend to slow down when the housing 12 slows down. Thus, a frictional force between the shoes 26, 28 and the inside of the outer wall 16 will be introduced into the housing 12 by centrifugal force and by the springs 34, 36, and this frictional force, which will be synchronous with and oppositely directed with respect to the torque experienced by the timing drive as a result of its natural resonant frequency, serves to dampen the amplitude of the vibrations experienced by the timing drive when it is vibrating at its resonant frequency. In other words, the frictional force resulting from the engagement of the outer wall 16 of the housing 12 by the shoes 26 and 28 will, therefore, tend to dampen the oscillations of the timing drive when the timing drive vibration frequency passes through its resonant frequency.

Although the best mode contemplated by the inventor for carrying out the present invention as of the filing date hereof has been shown and described herein, it will be apparent to those skilled in the art that suitable modifications, variations, and equivalents may be made without departing from the scope of the invention, such scope being limited solely by the terms of the following claims and the legal equivalents thereof.

What is claimed is:

1. A friction tuned damper (10) for damping the vibrations of a timing drive of an internal combustion engine, the timing drive including a camshaft (C) and a member (S) secured to the camshaft for rotation therewith, the damper comprising:

an annular housing (12) comprising:
        an inner annular wall (14), said inner annular wall being adapted to be secured to the camshaft to be rotatable therewith,
        an outer annular wall (16) spaced from and surrounding said inner annular wall, and
        a partition (20) extending between and connecting said outer annular wall and said inner annular wall and defining, with said inner annular wall and said outer annular wall, an opposed pair of compartments (22, 24);

an opposed pair of shoes (26, 28), one of said opposed pair of shoes being positioned in each of said opposed pair of compartments; and compression spring means (30) biasing each of said opposed pair of shoes outwardly into frictional engagement with said outer annular wall.

2. A damper according to claim 1 wherein said compression spring means (30) comprises a plurality of compression springs (34) for each of said opposed pair of shoes, each of said plurality of compression springs being trapped between the partition and the shoe of said opposed pair of shoes that is biased by said compression spring.

3. A damper according to claim 2 wherein said partition is provided with a plurality of openings extending therethrough, and where one of said plurality of compression springs biasing one of said pair of shoes is axially aligned with another of said compression springs biasing the other of said pair of shoes, and further comprising:

a plurality of pins (32), each said plurality of pins extending through one of said openings in said partition, said each of said plurality of pins slidably supporting an axially aligned opposed pair of said compression springs.

4. A damper according to claim 1 wherein said annular housing further comprises;

an annular end wall (18) extending transversely of and joining said inner annular wall, said outer annular wall and said partition.

5. A damper according to claim 4 wherein said annular housing is formed from a metal in a single piece.

6. A damper according to claim 5 wherein said annular end wall comprises a plurality of openings (38) extending therethrough, each of said openings being adapted to permit lubricant to enter said annular housing.

7. A damper according to claim 1 wherein said compression spring means (30) comprises a plurality of concentric pairs of compression springs (34, 36) for each of said opposed pair of shoes, each of said plurality of concentric pairs of compression springs being trapped between the partition and the shoe of said opposed pair of shoes that is biased by said concentric pair of compression springs.

8. A damper according to claim 7 wherein said annular housing further comprises;

an annular end wall (18) extending transversely of and joining said inner annular wall, said outer annular wall and said partition.

9. A damper according to claim 8 wherein said annular housing is formed from a metal in a single piece.

10. A damper according to claim 9 wherein said annular end wall comprises a plurality of openings (38) extending therethrough, each of said openings being adapted to permit lubricant to enter said annular housing.

11. A damper according to claim 1 wherein said damper has a central axis of rotation, wherein said opposed pair of shoes is able to oscillate with respect to said outer annular wall, and wherein said compression spring means comprises:

a spaced apart pair of compression spring means positioned on opposite sides of the central axis of rotation, one of said spaced apart pair of compression spring means being compressed and the other of said spaced apart pair of compression spring means expanding by oscillating movement of said opposed pair of shoes with respect to said outer annular wall.

12. A damper according to claim 11 wherein each of said spaced apart pair of compression spring means comprises a plurality of compression springs for each of said opposed pair of shoes, each of said plurality of compression springs being trapped between the partition and the shoe of said opposed pair of shoes that is biased by said compression spring.

13. A damper according to claim 12 wherein said partition is provided with a plurality of openings extending therethrough, and wherein one of said plurality of compression springs biasing one of said pair of shoes is axially aligned with another of said compression springs biasing the other of said pair of shoes, and further comprising:

a plurality of pins, each said plurality of pins extending through one of said openings in said partition, said each of said plurality of pins slidably supporting an axially aligned opposed pair of said compression springs.

14. A damper according to claim 11 wherein said annular housing further comprises:

an annular end wall extending transversely of and joining said inner annular wall, said outer annular wall and said partition.

15. A damper according to claim 14 wherein said annular housing is formed from a metal in a single piece.

16. A damper according to claim 15 wherein said annular end wall comprises a plurality of openings extending therethrough, each of said openings being adapted to permit lubricant to enter said annular housing.

17. A damper according to claim 11 wherein each of said spaced apart pair of compression spring means comprises a plurality of concentric pairs of compression springs (34, 36) for each of said opposed pair of shoes, each of said plurality of concentric pair of compression springs being trapped between the partition and the shoe of said opposed pair of shoes that is biased by said concentric pair of compression springs.

18. A damper according to claim 17 wherein said annular housing further comprises:

an annular end wall extending transversely of and joining said inner annular wall, said outer annular wall and said partition.

19. A damper according to claim 18 wherein said annular housing is formed from a metal in a single piece.

20. A damper according to claim 19 wherein said annular end wall comprises a plurality of openings extending therethrough, each of said openings being adapted to permit lubricant to enter said annular housing.

* * * * *

UNITED STATES PATENT AND TRADEMARK OFFICE
CERTIFICATE OF CORRECTION

PATENT NO.  : 5,619,887
DATED       : April 15, 1997
INVENTOR(S) : Roger T. Simpson It is certified that error appears in the above-indentified patent and that said Letters Patent is hereby corrected as shown below:

Column 1, line 12, delete "on" insert ---- a ----.

Column 6, line 10, delete "pair" insert ---- pairs ----.

Signed and Sealed this

Eighth Day of July, 1997

*Attest:*

BRUCE LEHMAN

*Attesting Officer*      Commissioner of Patents and Trademarks